United States Patent [19]
Gelardi et al.

[11] Patent Number: 5,201,476
[45] Date of Patent: Apr. 13, 1993

[54] WELDED VIDEO CASSETTE

[75] Inventors: Paul J. Gelardi, P.O. Box 127, Cape Porpoise, Me. 04014; John A. Gelardi; David A. Capotosto, both of Cape Porpoise, Me.

[73] Assignee: Paul J. Gelardi, Kennebunkport, Me.

[21] Appl. No.: 764,526

[22] Filed: Sep. 24, 1991

Related U.S. Application Data

[63] Continuation-in-part of Ser. No. 522,361, May 11, 1990, Pat. No. 5,092,536, and Ser. No. 639,516, Jan. 10, 1991, Pat. No. 5,114,092.

[51] Int. Cl.$^5$ .......................................... G11B 23/087
[52] U.S. Cl. ............................................................ 242/199
[58] Field of Search ................. 242/76, 197, 198, 199, 242/200; 360/130.21, 132; 206/387, 389

[56] References Cited

U.S. PATENT DOCUMENTS

| | | | |
|---|---|---|---|
| Re. 32,447 | 6/1987 | Gelardi et al. | 242/199 |
| D. 245,418 | 8/1977 | Katayama et al. | D14/121 |
| D. 271,392 | 11/1983 | Sumisha et al. | D14/121 |
| D. 274,327 | 6/1984 | Sumisha et al. | D14/121 |
| D. 280,815 | 10/1985 | Gelardi et al. | D14/121 |
| D. 303,796 | 10/1989 | Nishiyama et al. | D14/121 |
| 3,735,939 | 5/1973 | Inaga | 242/198 |
| 3,900,171 | 8/1975 | Serizawa | 242/198 |
| 3,910,692 | 10/1975 | Scibilia | 242/199 X |
| 3,980,255 | 9/1976 | Serizawa | 242/199 X |
| 4,004,752 | 1/1977 | Kanaya | 242/198 |
| 4,090,680 | 5/1978 | Karsh | 242/195 |
| 4,106,724 | 8/1978 | Higashida | 242/198 |
| 4,129,469 | 12/1978 | Deverell et al. | 242/58.1 X |
| 4,184,594 | 1/1980 | Hehn | 242/199 X |
| 4,203,564 | 5/1980 | Nemoto | 242/71.8 |
| 4,232,350 | 11/1980 | Ohta | 242/199 X |
| 4,232,840 | 11/1980 | Sugawara | 242/198 |
| 4,290,567 | 9/1981 | Saito | 242/199 X |
| 4,367,963 | 1/1983 | Daughters | 242/199 X |
| 4,431,139 | 2/1984 | Barnsbee et al. | 242/71.1 X |
| 4,438,846 | 3/1984 | Stylianou | 206/387 |
| 4,447,020 | 5/1984 | Toi et al. | 242/198 |
| 4,453,683 | 6/1984 | Reimer et al. | 242/199 |
| 4,485,988 | 12/1984 | Kukuya et al. | 242/199 |
| 4,519,521 | 5/1985 | Yoshii | 242/198 X |
| 4,575,023 | 3/1986 | Komiyama et al. | 242/199 |
| 4,591,936 | 5/1986 | Kikuya et al. | 242/198 X |
| 4,624,423 | 11/1986 | Schoettle et al. | 242/199 |
| 4,629,144 | 12/1986 | Schoettle | 242/198 |
| 4,662,579 | 5/1987 | Gelardi et al. | 242/199 |
| 4,678,080 | 7/1987 | Nelson | 206/387 |
| 4,706,149 | 11/1987 | Machida et al. | 242/199 X |
| 4,712,148 | 12/1987 | Balz et al. | 242/199 X |
| 4,736,904 | 4/1988 | Schoettle et al. | 242/76 X |
| 4,740,856 | 4/1988 | Yoshii et al. | 360/132 |
| 4,773,615 | 9/1988 | Carroll | 242/199 |
| 4,789,114 | 12/1988 | Tanaka | 242/199 |
| 4,793,570 | 12/1988 | Gelardi et al. | 242/199 |
| 4,802,044 | 1/1989 | Iwahashi et al. | 242/199 X |
| 4,802,048 | 1/1989 | Perkins et al. | 242/199 X |
| 4,803,575 | 2/1989 | Nishimura et al. | 360/132 X |
| 4,807,077 | 2/1989 | Zaitsu et al. | 360/132 |
| 4,809,113 | 2/1989 | Nishimura et al. | 360/132 |
| 4,842,217 | 6/1989 | Vinson | 242/199 |
| 4,844,377 | 7/1989 | Shiomi et al. | 242/198 |
| 4,874,143 | 10/1989 | Armstrong et al. | 242/198 |
| 4,883,176 | 11/1989 | Hart et al. | 242/199 X |
| 4,886,220 | 12/1989 | Oishi | 242/198 X |
| 4,930,821 | 6/1990 | Jang | 242/197 X |
| 4,969,612 | 11/1990 | Thomas | 242/199 |
| 4,986,491 | 1/1991 | Gelardi et al. | 242/199 |
| 4,993,661 | 2/1991 | Tollefson | 242/199 X |
| 5,024,394 | 6/1991 | Ozawa et al. | 242/198 |
| 5,092,536 | 3/1992 | Gelardi et al. | 242/199 |

FOREIGN PATENT DOCUMENTS 0285384 10/1988 European Pat. Off. .
0417969 3/1991 European Pat. Off. .
WO88/08196 10/1988 World Int. Prop. O. .
WO91/07752 5/1991 World Int. Prop. O. .

Primary Examiner—Daniel P. Stodola
Assistant Examiner—John P. Darling
Attorney, Agent, or Firm—James Creighton Wray

[57] ABSTRACT

An integrally molded video cassette comprises a base, a cover, front and opposite rear walls extending from the base toward the cover. An integral hinge is provided between the rear wall and the cover and a dust cover integrally hinged to the cover opposite the rear wall hinge. First and second side walls extend between front and rear walls and between the cover and the base. Mated alignment guides and engagements are provided on the base and the cover, and welding attachments are provided between the base and the cover for securing the cover to the base.

46 Claims, 10 Drawing Sheets

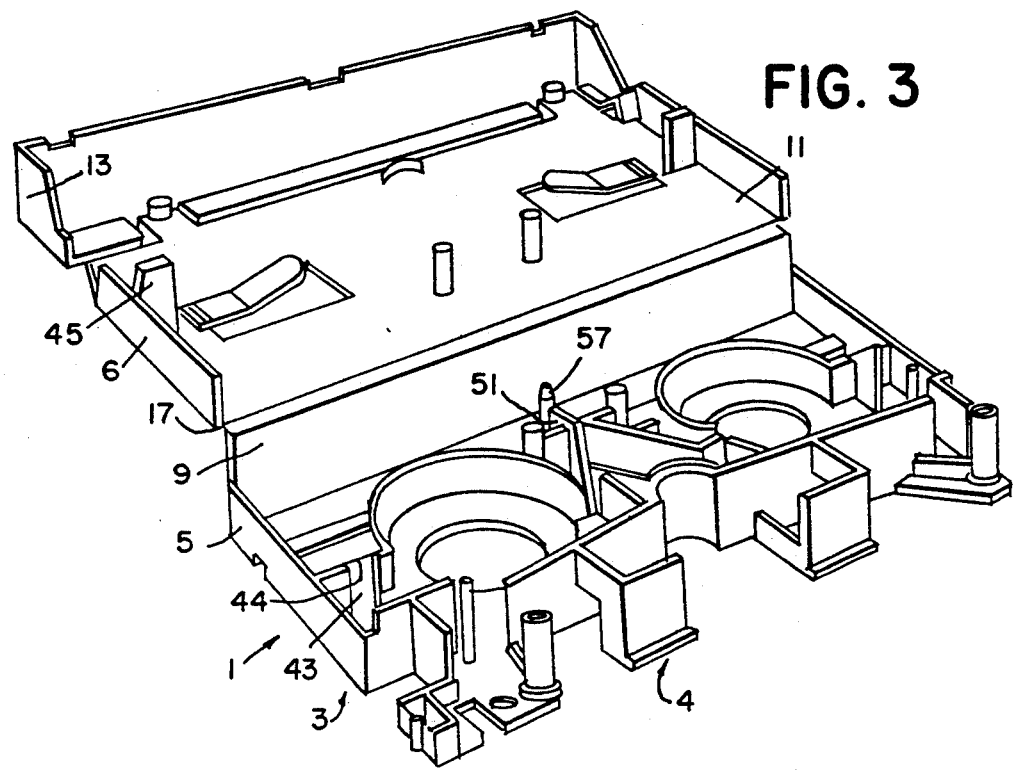
FIG. 3
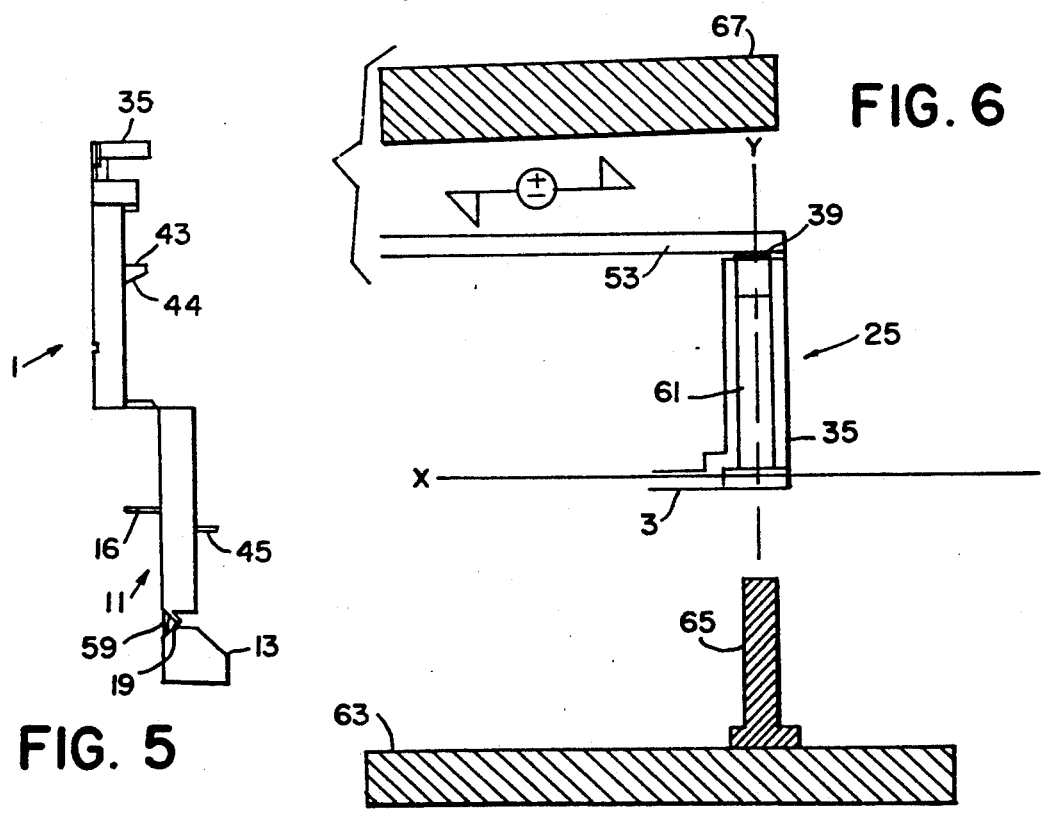
FIG. 5
FIG. 6

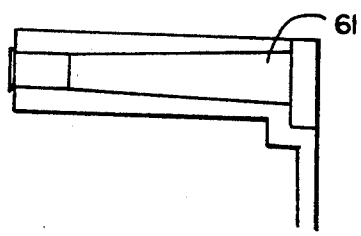
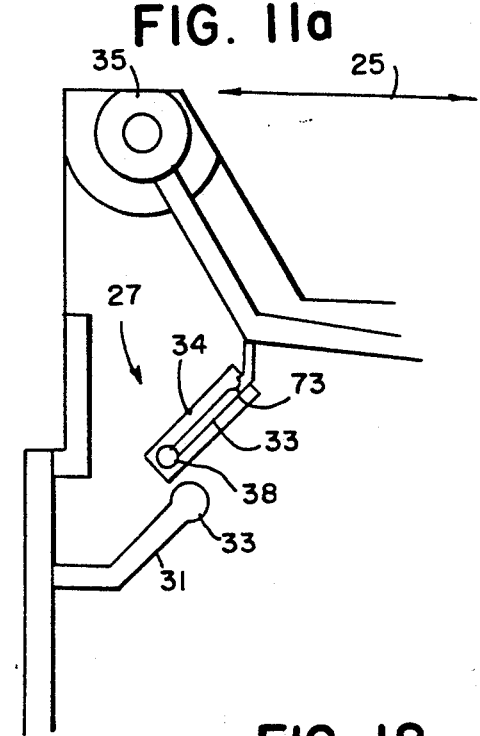
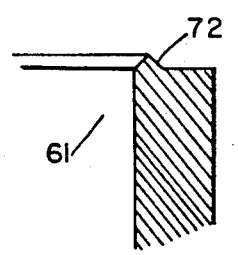
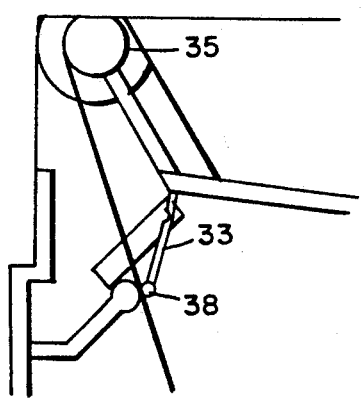
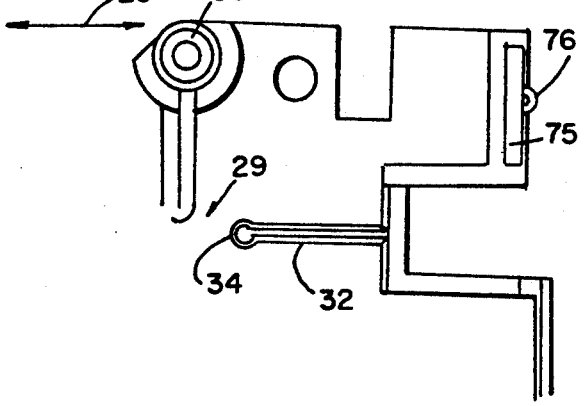

FIG. 15
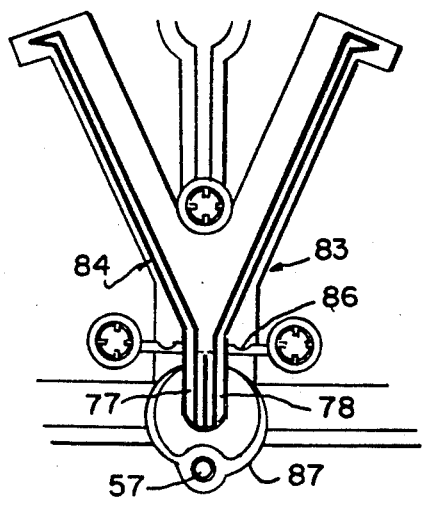
FIG. 16a
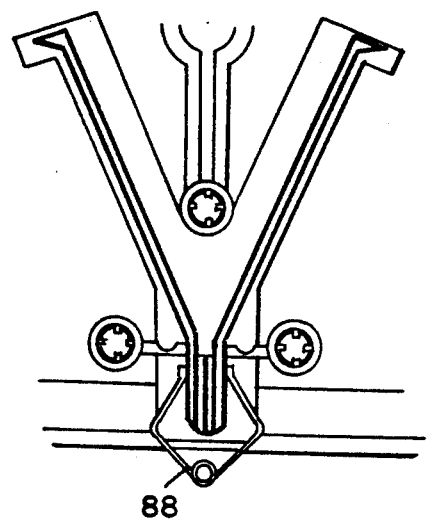
FIG. 16b
FIG. 19
FIG. 20a
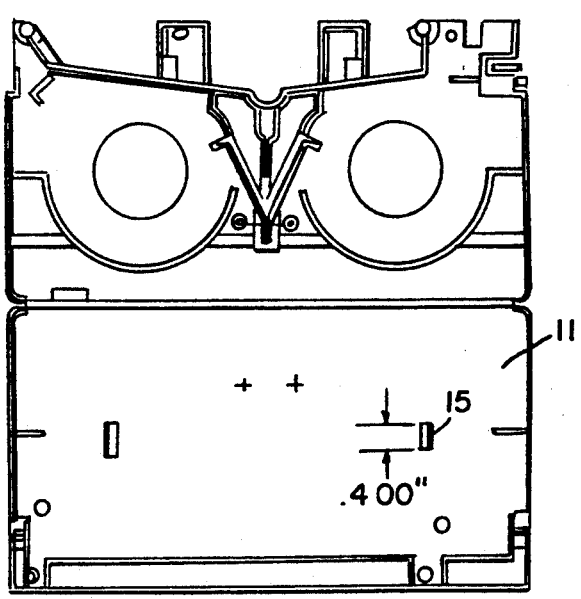
FIG. 20b
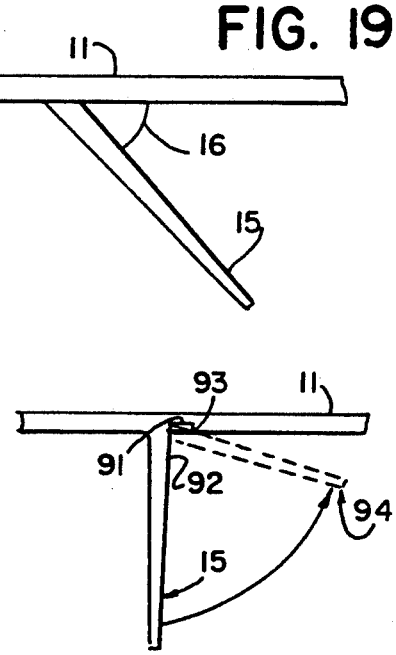

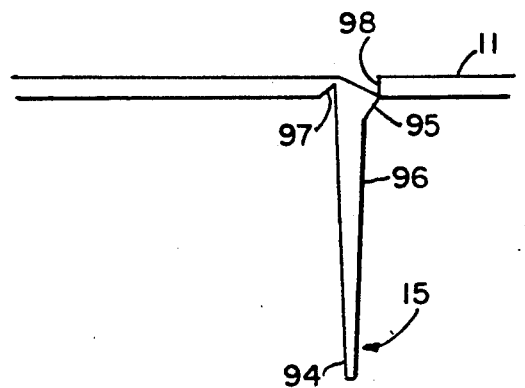
FIG. 21a
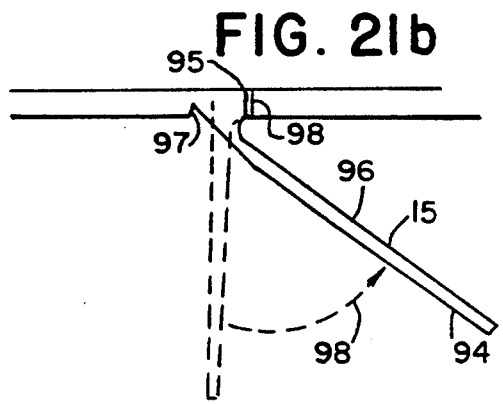
FIG. 21b
FIG. 22a
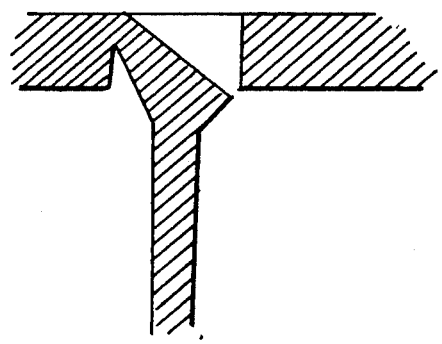
FIG. 22b
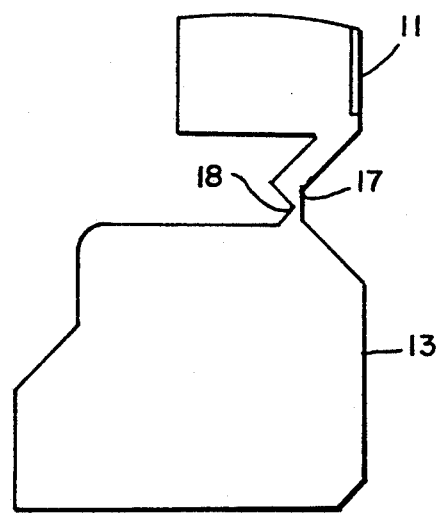
FIG. 23
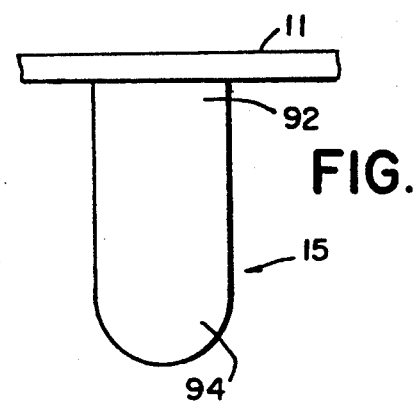
FIG. 20c

WELDED VIDEO CASSETTE

BACKGROUND OF THE INVENTION

This is a continuation-in-part of application Ser. Nos. 522,361 filed May 11, 1990, now U.S. Pat. No. 5,092,536, and 639,516 filed Jan. 10, 1991, now U.S. Pat. No. 5,114,092.

This invention relates to recyclable low cost video cassettes.

The number of households and businesses with standard format video tape cassette players is very large and is expected to increase shortly to substantially full saturation in 80% or more of households and businesses. Many households and businesses have more than one video tape cassette player. Each of the cassette players is a potential user of many cassettes. Many of the cassettes will be used only once or only a few times. The infrequently used cassettes are usually constructed in the same manner as frequently used cassettes.

The cassette players offer a resource for short term information and advertising. For advertising tapes having only small numbers of plays, cassette housings, reels and brakes are available only in full-cost conventional designs, which add to the cost of what otherwise might be low cost advertising media. For example, the cost of the cassettes may far outweigh the cost of producing, planning and delivering advertising tapes to prospective customers for goods and services. It is expected that such advertising cassettes may be used once or twice and then may be destroyed.

Currently available standard video cassettes are made of up to 37 parts. The parts which make up the cassette are of different construction and different types of materials. That makes it difficult to salvage and recycle the materials when the cassettes are thrown away.

Standard video cassettes made with 37 parts have large numbers of assembly steps and assembly stations. The number of assembly steps and stations is directly related to the cost of manufacturing the video cassettes.

The costs of producing the individual parts and of assembling the separate parts increases the cost of the cassettes.

A need exists for a cassette housing which is made out of material which may be readily recycled without disassembling the cassette. Similarly, a need exists for a low cost video cassette to take advantage of the market that exists for low price prerecorded cassettes and free distribution cassettes used to advertise products and services.

SUMMARY OF THE INVENTION

The shell of the present invention has been constructed to weld the cassette shut. Welding energy directors and other features allow a weld-type closure to take advantage of welding. Welding of the shell has many advantages over the current screw-type video cassettes and snap or press-fit-type closures. Welding simplifies the design and creates a more rigid structure. That is very important, particularly with a polypropylene shell, which is typically less rigid than styrene. Welding allows the clamping of the shell flat and then the welding into a flat rigid structure. Welding also provides a tamper-evident structure, which prevents the removal and substitution of the tape pack. In addition, welding eliminates the metal screws currently used and makes the cassette more recyclable. Welding promotes the use of relatively low cost and plentiful and easily recycled polypropylene.

The cassette has been provided with alignment ribs on the cover and camming ribs on the base. Those allow a simplified closure, which is easily automated and self-aligns the cover and base front to back. The fit of the cover alignment ribs between the side walls and the circular tape containment walls provide side-to-side alignment and add stiffness. The interference of those ribs also creates a "snap"-type fit to keep the shell closed after assembly and prior to welding.

The guide posts and guide pins are constructed without bosses to eliminate closure problems. The cassette is self-aligning, allowing it to accept alignment pins and then using the welding process to flatten and weld the cassette flat rather than trying to fight the plastic warpage every step of the way.

Guide post perpendicularity is assured. It is important that the guide posts are perpendicular. Poor perpendicularity can cause tape tracking errors. In the guide post design, the guide posts are cored out from the bottom of the cassette to allow alignment pins to be inserted into the posts to insure the guide posts are perpendicular during molding and welding of the shell. The tops of the guide posts have energy concentrator welding energy directors. The welding energy director is a ring but may be formed in a variety of shapes, for example an "X". The inside surface of the shell cover has been provided with a flat surface so that nothing interferes with the welding of the cassette. When the cassette is welded it insures that the guide post alignment remains true, even when the alignment pins are removed after welding.

The two guide pins are supported by guide ribs. That eliminates cover guide pin bosses, eases assembly and maintains contact surface perpendicularity. Welding energy directors at the top leading edges of the guide pins and ribs prevent the possibility that the tape could ride over the tops of the ribs.

Notches in the reel lock arm attachment webs create living hinges. A pin accepts a supplemental brake spring. Notching the attachment webs reduces the spring force and creates a stress concentration, which creates a living hinge when flexed. The supplemental spring can be either metal or plastic. The contact point of the spring on the reel lock arms is close to the hinging point, allowing the retractor pin a mechanical advantage and minimizing the amount of deflection of the spring when the pin enters the reel lock gap. Minimizing the spring deflection reduces the stress on the plastic spring and improves its ability to return to its original position. The plastic spring is made from a material with memory characteristics better than the commodity polypropylene used for the shell, such as a special purpose grade polypropylene, or acetal, or Hytrel, a thermoplastic elastomer.

A lubricant on the top of the reel contact button reduces friction between the polypropylene reel and the polypropylene reel leaf spring. The lubrication eliminates wear of the reel contact button and spring, particularly during tape winding, fast forward and rewind. Friction causes heat which can plastically deform the contact button. Plastic deformation of the contact button increases running torques.

The polypropylene guide posts and pins can burnish the tape, actually improving tape performance and reducing dropouts. This invention provides polypropylene contact surfaces which improve tape performance. The placement of one or more polypropylene tape guide surfaces which contact the oxide side of the tape at all times burnishes the entire tape pack. The invention provides the use of polypropylene for manufacturing standard video cassettes. The use of polypropylene even in a standard design is compelling due to the 40% material savings and the potential for integral pins, posts, tape-contacting surfaces and recyclability.

This invention provides leader tape welding to the reel. The invention uses polypropylene film which is biaxially or machine-oriented film. Non-oriented polypropylene film does not have adequate tensile strength.

Another reel leaf spring of the present invention features a simple flat molded profile with an opposing molded snap at the end which attaches via a hinge to the cover. A molded snap is formed by a shut-off in the mold which allows the spring to hinge and snap into position, and which fills the cutoff hole in the cover, providing a nearly flush cover surface.

A molded take-up side light screen includes a cantilevered door latch. Light screens with light source holes are molded by use of a swipe shut-off and undercuts with a ramped profile to allow ejection of the undercut without use of a side action. Molding translucent light screens and the use of masks create "windows" that cannot become clogged or obstructed with dirt. A preferred dust door is either notched or has a molded hole to allow the light source to be visible even when the door is closed.

The present invention provides the low cost video cassette housing of uniformly manufactured compatible materials which will easily be recyclable and in which the principal components are made in the same mold cavity and are assembled by rapid uniform motions. The housing and the hub locks are made in a single cavity, and the housing and reels are made of similar material. When a device has been used, the entire device may be easily recycled with other plastic materials. The plastic cassette may then be crushed, ground and reformed into other useful devices. The magnetic recording tape preferably is pulled from the reels before disposal, but that is not mandatory since polypropylene and polyester are compatible and may be mingled in reuse.

Assembly steps are limited to removing the entire cassette from a mold, dropping reels into place, with leaders extending from the cassette housing, and then folding the back upward, and folding the cover downward until the cover is welded in place. The cassette is ready for use by attaching a prerecorded magnetic tape to the leaders. That, of course is in the present invention's most basic preferred embodiment. Some other optional added parts would vary the steps for assembly.

Alternately, the magnetic tape may be pre-attached to leaders and the reels, before the reels and tape are dropped into place in the housing. The cover is then folded inward, and the cover is welded into place in a single continuous motion to ready the cassette for usage.

The preferred cassette housing is made in one continuous piece with living hinges between the pieces, which include the base, rear wall, cover, dust door and hub lock. All of the materials are made of single or compatible plastic materials.

A preferred video tape cassette housing incorporates a base, a rear wall, and first and second opposite side walls connected to the base. A cover is connected to the rear wall, and a dust door is connected to the cover. The side edges of the rear wall engage the rear edges of the side wall, and the side edges of the cover contact the upper edges of the side walls.

Preferably the cover incorporates partial side walls that mate with side walls extending from the base.

The dust door is hinged on downward extensions at edges of the cover for permitting movement of the cover between a raised position and a lowered position to thereby expose or cover a magnetic tape extending along the front of the cassette housing.

The hinges between the sections of the cassette are living hinges which are integrally formed between these sections. The living hinges allow a more efficient molding process and sufficiently decrease the number of parts used in the prior art.

In one form, the cover is made with large, spaced openings. Hub springs, which are attached by living hinges, extend inward from the openings. Backing covers snap into the openings to provide backing for the springs. The hub springs are molded to extend inward and downward into the casing when the cover is assembled on the base.

In another form, the housing further includes first and second leaf springs hinged near side edges of the cover. In one form, the springs fold inward and rest atop hubs within the cassette housing. The springs are also connected to the cover with integral living hinges, wherein the hinges provide a certain amount of resiliency for the springs. Backing snaps are positioned in the cover at spaced distances from the hinge connections with the springs. The snaps are aligned with the hinge connections for underlying portions of the springs and for biasing distal ends of the springs towards engagement with the hubs. Engagement means are positioned on the cover between the springs and the snaps or, alternately, are integral with the snaps. The engagement means are complementary to portions of the snaps for backing the springs on the snaps against the force of the resilient living hinges. The distal end portions of the springs apply spring pressure to the hub. In one form, the engagement means are first and second engagement snaps positioned on the sides of the backing snap for engaging the sides of a hole in the cover as the backing snap is folded inward within the cover.

In a preferred embodiment, the dust door has downward extensions on first and second sides that each have edges hinged to downward extensions at ends of the front edge of the cover. Further, one side of the dust door incorporates a retaining means for attaching and latching the door in the closed position when not in use. The dust door side retaining means are mated with retaining means on the base sides.

In one embodiment, a dust door lock is a protrusion on a self-formed thin spring on a side wall of the base. The lock is engages in indentation in the dust door for holding the dust door in closed position.

Complementary welding surfaces on the cover and at least one of the front wall, side walls or guide posts engage to hold the cover downward, with side edges of the cover or cover side walls contacting upper edges of the base side walls. The housing in the position with the cover closed is substantially a box having a cover and a base in parallel planes, rear and side walls lying vertically around the edges therebetween and a living hinged door movably affixed to the front edge of the cover. The complementary welding surfaces are provided with welding energy directors on at least one surface for welding the cover closed. One method used is subjecting the beads, in this case energy directors, to ultrasonic energy for welding the cover closed.

Vertical tape cavity enclosing walls generally extend upward from the base between the forward portions of the first and second side walls. The forward walls have first and second tape gaps, through which a tape passes out from and into the cassette housing. First and second tape guides extend between the base and cover of the wall, and interior tape guide pins on fixed ribs vertically extend from positions near the tape gaps for angularly guiding the tape through the forward wall gaps or openings. Guide posts are mounted between base and cover extensions for redirecting the tape across the tape guide projections. Preferably all of these elements are molded in a the same mold cavity to limit the number of parts needed for the cassette.

A preferred housing incorporates semi-cylindrical walls molded within the base and spaced around hub openings for receiving and holding the reels for guiding the winding magnetic tape. The cylindrical walls form reel wells.

The tape reels incorporate a means for quickly attaching and holding the end of a magnetic tape leader. The reels drop into the walled reel receivers to thereby simplify inserting the tape reels in the housing. The reels incorporate means for mating with hub lock brakes to effectively lock the hubs into place when the cassette is not in use. One preferred reel is approximately 2.5 inches in diameter and has a one-piece reel design, which is molded by the use of side actions, which form the internal flange and hub outer surfaces. A conventionally sized reel requires the side actions to travel a distance greater than the hub diameter to allow ejection from the mold. That makes a conventional sized hub less economically practical, since it requires a much larger mold and injection molding machine. The 2.5 inch mini-hub uses less material, reduces the side action travel and allows tighter linear cavity placement, making a one-piece reel less expensive.

A long-play version uses standard full size reel.

A reel lock brakes the reels when not in use. The lock is an integrally molded apparatus incorporating two brake release arms which engage the reels when not in use. A brake release pin separates the arms and allows rotational movement of the reels.

These and further and other objects and features of the invention are apparent in the disclosure, which includes the above and ongoing written specification, with the claims and the drawings.

BRIEF DESCRIPTION OF THE DRAWINGS

FIG. 3 is a perspective front view of a preferred integrally molded video cassette.

FIG. 5 is a side view of the molded shell.

FIG. 6 shows a preferred welding technique of the present invention, utilizing a sonic welding horn and nesting with guide post perpendicularity pin.

FIGS. 10a, 10b and 10c show an alternate preferred guide post with a raised circular energy director.

FIG. 11a is a top plan view of a supply side internal guide, a pressure flap in a formed position, and an external guide post.

FIG. 11b is a detail of a pressure flap in operational position.

FIG. 12 is a top plan view of the take-up side external guide post and internal guide.

FIGS. 15, 16a and 16b show the supplementary springs for the reel locks.

FIG. 19 shows the molded, downwardly extending leaf spring disclosed in FIG. 18b.

FIG. 20a, 20b and 20c show an alternative leaf spring, molded approximately perpendicular to the cover.

FIGS. 21a and 21b show a side view of a preferred leaf spring in the molded and enabled positions, respectively.

FIGS. 22a and 22b are detail views of the molded and snapped positions as shown in FIGS. 21a and 21b.

FIG. 23 is a side view of the hinged dust door.

DETAILED DESCRIPTION OF THE DRAWINGS

Figure 1:
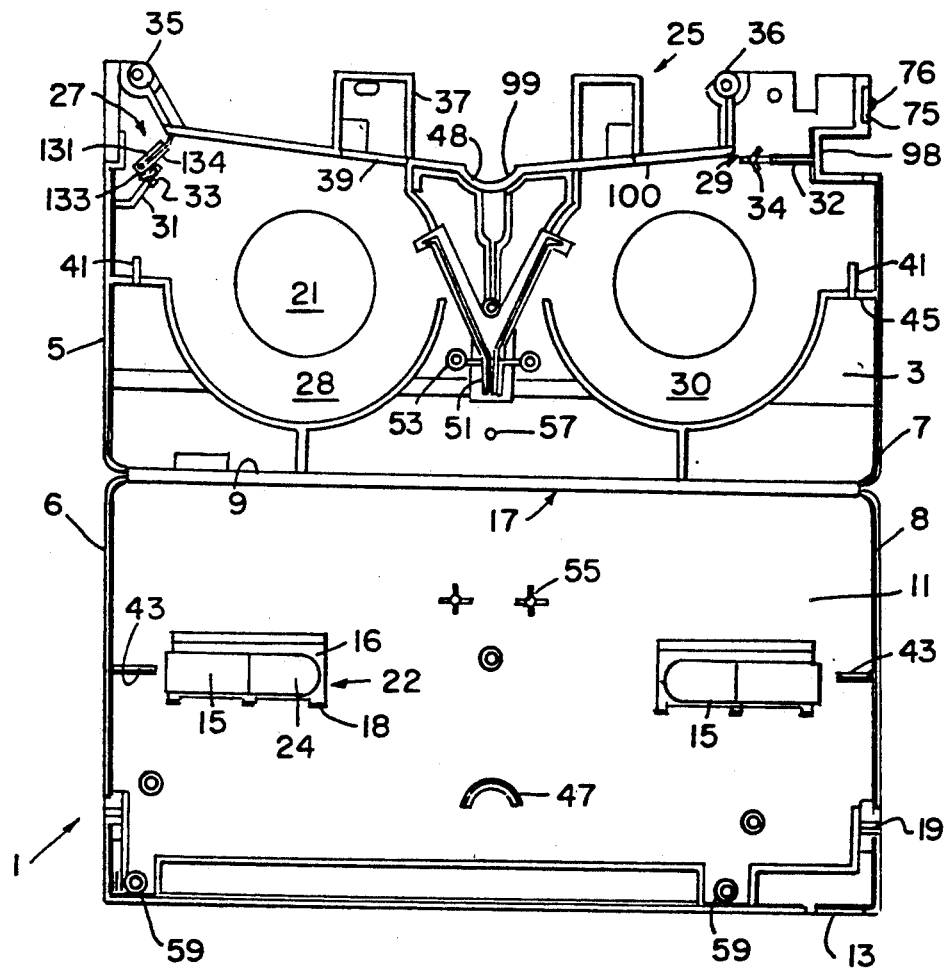
FIG. 1 is a top plan view of the preferred invention, with shaded areas depicting preferred welding energy directors.

Referring to FIG. 1, a tape cartridge housing or shell is generally indicated by the numeral 1. The housing has a base 3, first and second opposite side walls 5 and 7, rear wall 9, cover 11, dust door 13 and hub springs or reel springs 15, which are all integrally molded. Living hinges 17 and 19 respectively join the rear wall to the cover, and the cover to the dust door. The base 3 includes an integrally molded front wall 25, which has tape gaps or apertures 27 and 29 for supply side reels and take-up side reels (not shown) respectively. Supply side reel well 28 and take-up side reel well 30 hold the respective reels. The reel wells have central apertures 21 for insertion of tape drivers within a video cassette recorder. The base has internal and external guide means perpendicularly extending from a plane of the base. The internal guide pins 33 and 34 are preferably formed on ends of rigid ribs 31 and 32 extending from the side walls. The pins 33 and 34 are attached to the ribs. The tape, during normal operation, leaves the supply side reel and passes around the rounded supply side pin 33 and through the supply side gap 27. The rib 31 maintains the perpendicularity of the pin 33, and thus maintains tape alignment for proper use. The tape is positioned around a supply side external guide post 35 and across front faces of flat guides 37 of the cassette, around a take-up side external guide post 36, through the take-up side gap 29, around the take-up side internal guide pin 34 and onto the take-up reel. The external guide posts 35 and 36 are preferably rounded posts which extend perpendicular from the base towards the cover and which are joined to the cover when the cassette is closed. The center of the front wall has two integrally molded guide extensions 37 which control the position of the tape between the supply and take-up guide posts 35 and 36.

A primary object of the present invention is to improve the closure of an integrally molded tape cassette. Welds are the primary fastening means. In the present invention, shaded areas 39 are welding energy directors which are used to attach the cover to the base. These welding energy directors are preferably incorporated on top edge portions of the forward walls, and further on the tops of the internal pins and external guide ports. Providing the guide means with welding energy directors allows the posts to maintain perpendicularity through an integral attachment to the base at bottom ends, and fusion through welding at the top ends.

Mated alignment means on the cover and on the base assist in properly aligning the cover on the base. In a preferred embodiment, the base is provided with cams 41, which are ramped structures for receiving alignment ribs 43 integrally molded with the cover. The cams 41 have an adjacent alignment nests 45 which are the same size as the cover ribs 43. The ramps of the cams funnel the ribs into the nests when the cover is closed upon the base, and snaps the ribs into place for proper alignment prior to welding of the structure in the closed position. A forward wall alignment means 47 integrally molded with the cover mates with a center portion 48 of the forward wall to ensure proper frontal alignment of the dust door and forward wall.

A reel lock 51 is preferably molded into the base between the reel wells, and preferably incorporates lock support posts 53 which mate with alignment pins 55 extending from the cover. The pins 55 maintain perpendicularity of the reel lock 51, and further align the cover on the base. Welding energy directors can be incorporated onto the mated portions of these structures to fuse them together and ensure perpendicularity and permanent alignment and to prevent tape from passing over tops of the pins and posts.

Side walls 5 and 7 can be partial side walls extending from and integrally molded with the base. Supplemental mating side walls 6 and 8 extend from and are integrally molded with the cover. Stepped edges of the base and cover side walls interfit when the cover is closed. The ridges on side wall edges can be energy directors for ultrasonic welding.

The welding energy directors 39 provided atop the front wall, guide posts, alignment posts and/or side walls are pressed against the opposite structure, and a sonic welding horn causes the energy director to heat, fusing the opposing structures.

In FIG. 3, the tape 1 is shown with its base 3, front wall 4, rear wall 9, cover 11 and dust door 13. The cover/rear wall living hinge 17 forms an axis which the cover revolves around to close on the base. The camming ribs 43 are shown with camming rib ramps 44, which move rearward the alignment ribs 45 extending from the cover.

Preferably, a supplemental spring anchor 57 extends from and is integrally molded to the base proximal the hub or reel lock 51 for maintaining the integrity of the integrally molded reel lock. Mated side walls 5 and 6 as shown meet approximately half way along the rear wall, with the side walls extending transversely between ends of the front and rear walls providing end stability to the base and the cover.

Figure 4:
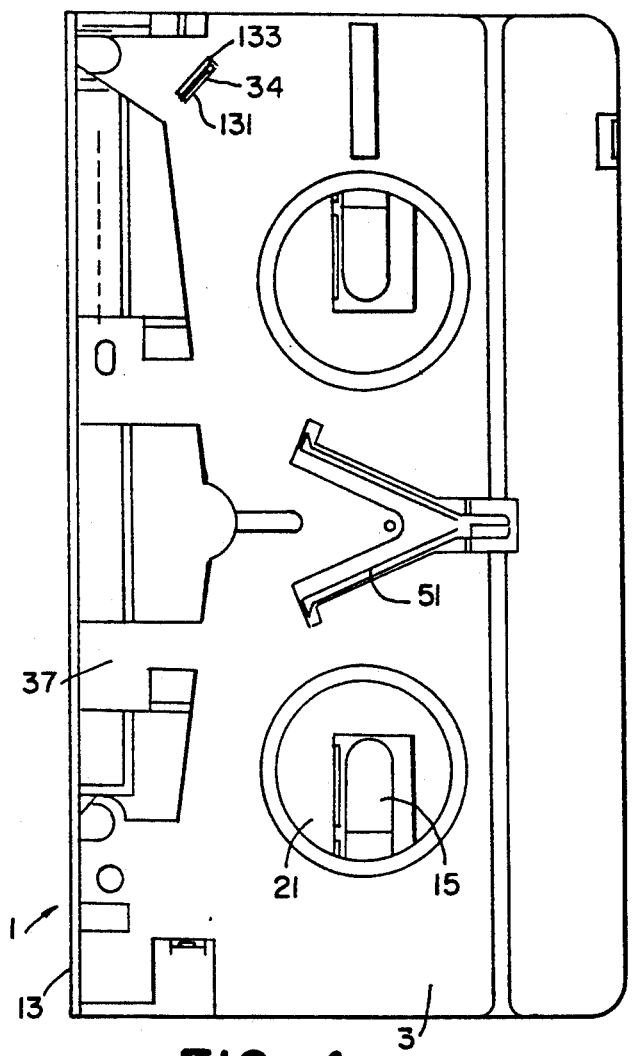
FIG. 4 is a bottom view of the welded video cassette

FIG. 4 is a bottom view of the assembled shell showing the base 3, reel well apertures 21, and leaf springs 15 extending from the cover adjacent the apertures for engaging reels, reel locks 51, dust door 13 and snubbing arm 131. A snubbing arm molding aperture 134 is provided in the base for molding the snubbing arm 31 to the front wall. The snubbing arm is cantilevered from the front wall, and has a tape engaging pin 133 which is perpendicular to a plane as prescribed by the base. The snubbing arm 131 preferably has a living hinge, which allows the arm to rotate rearward to position the snubbing arm engagement 133 rearward of fixed pin 33 and perpendicular to the base.

FIG. 5 is a side view of the molded housing. The alignment rib 45 is shown perpendicularly molded to the cover for mating with the camming rib 43 with ramp mating means 44. The perpendicular exterior post 35 extends from the base, and a preferred reel spring assembly incorporates a backing snap closure 16 molded to the cover for snapping into place on the cover. That is best shown in FIG. 1, where backing snap 16 on the cover incorporates cover engagement snaps 18, which engage detents in the edges of windows in the cover. Windows 22 are formed in the cover to mold the spring flaps 15. Thus, while the backing snap 16 is not engaged as in FIG. 5, the spring flap has no backing to force an angled leaf spring extension 24 against a reel hub.

One embodiment provides welding energy directors or energy directors at the engagements 18 for permanently holding the backing snaps in the window. As shown in FIG. 5, the dust door 13 is hinged to downward extensions from the cover 11 with widely spaced living hinges 19. Extending from the cover proximal the dust door are external post mating plates 59 to which the external posts are welded to maintain perpendicularity thereof.

Figure 7:
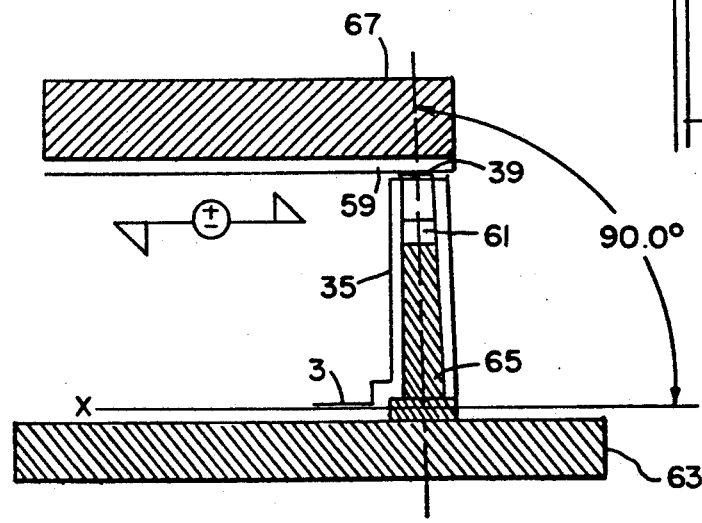
FIG. 7 is a side view of the welding apparatus and nested perpendicularity post.
Figure 13A:
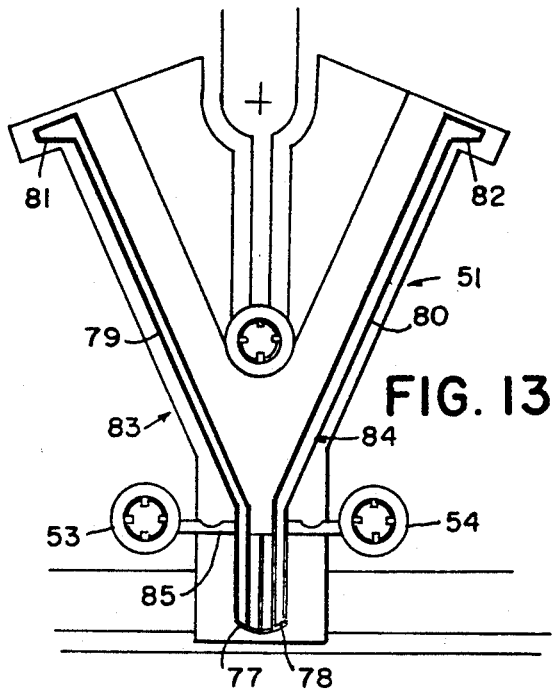
FIGS. 13a and 13b show a preferred reel lock, with opposed locking arms hinged on living hinges.
Figure 13B:
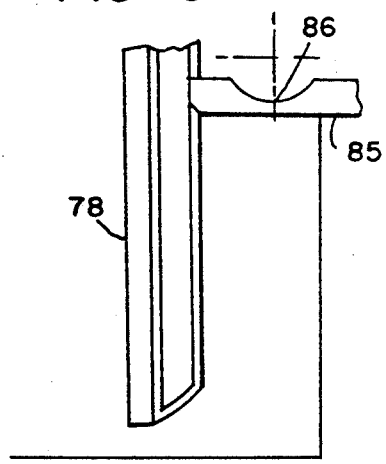

In FIG. 6, the external post mating plates 59 match with the external post 35 along the front face 25 of the cassette. The post preferably has an axial borehole 61, as prescribed by the Y axis which is perpendicular to a plane as prescribed by the base 3 and noted by at the X axis. The welding energy director 39 incorporated at the cover end of the post mates with the plate 59. During the welding operation of the present invention, the external post maintains perpendicularity through utilization of a nest 63 and attached perpendicularity post 65, which is inserted into the axial borehole 61 until the base rests upon the nest, as shown in FIG. 7.

The perpendicularity post 65 ensures a 90° angle between the ends of the external guide posts and the cover and base, and subsequent to insertion, a sonic welding horn 67 is placed on the cover proximal the welding energy director for welding the cover to the post. The same operation that welds the posts to the cover can also weld the other welding energy directors 39 to the cover, as shown in FIG. 1, the resulting time of closure requiring only seconds.

Figure 2:
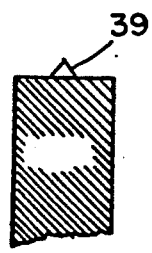
FIG. 2 is a cutaway side view of a front wall section showing energy director welding energy directors.
Figure 8A:
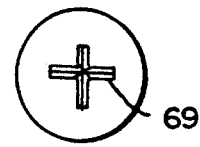
FIGS. 8a and 8b show a preferred guide post welding energy director, incorporating a raised energy director in the shape of a cross.
Figure 8B:
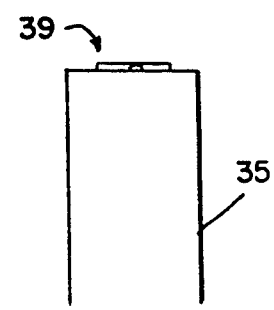

FIG. 8 shows a preferred post 35, which incorporates a welding energy director 39 that is a raised energy director having a crossed shape 69. Any shape may be used, one for example is in the form of a circle, as shown in FIG. 1. The front wall has straight welding energy directors as noted in FIG. 2.

Figure 9:
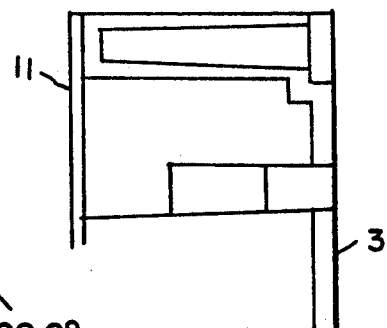
FIG. 9 is a cutaway side view of the molded guide post and sectional front wall.

FIG. 9 is a cutaway of the welded cover 11 attached to the base, front wall and posts.

FIGS. 10a, 10b and 10c show the alternative exterior post with circular energy director 71, which is a raised portion 72 extending around the axial bore 61.

FIG. 11a shows a pressure flap in molded position.

FIG. 11b shows the interior and exterior guide means, and pressure flap for the supply side reel. The exterior post 35 lies along a front face 25 and controls the position of the tape across the front of the cassette. The pressure flap 33 and attached tape slide 38 revolves on pressure flap hinge 73 to engage the tape as it passes through the aperture 27 around the inner guide post 33 and to contain any slack from the supply side reel.

In FIG. 12, the exterior post 36 lies adjacent the front face 25, with the tapes' path winding around the circular post through the aperture 29 and around the interior guide post 34, maintaining perpendicularity because of rib 32.

The preferred invention incorporates a dust door alignment plate 75 extending from the base proximal the front of the base, wherein the cover closes over the plate and snaps on to dust door retaining snap 76 attached to the plate 75. A groove on the dust mates with the snap 76, holding the dust door in place over the exposed tape during non-use.

Preferred reel locks are shown in FIGS. 13a and 13b and FIGS. 14a and 14b. The reel lock 51 has first and second actuation arms 77 and 78 in parallel relation. Attached to each actuation arm respectively are first and second cantilevered reel lock extensions 79 and 80, which are angled away from each other at the juncture of the extensions and the actuation arms. At ends of the reel lock extensions distal the juncture are shelves 81 and 82 which engage the reels. The actuation arms, extensions and shelves comprise first and second reel lock arms 83 and 84, which revolve around first and second hubs 53 and 54 respectively. The arms 83 and 84 are attached to the hubs 53 and 54 by hub attachments 85, which are preferably plates which extend between the hub and a point proximal the juncture of the extension and the actuation arms. The attachment plates 85 incorporate living hinges 86, which can in one case be a semicircular groove cut perpendicular to the plane of the base for prescribing a rotational movement of the reel lock arm in parallel to that plane. The rotational movement is caused when an engagement pin (not shown) in the video cassette recorder enters the housing between the actuation arms 77 and 78, thus separating the arms and causing the rotational movement around the hinge 86. That causes the extensions to come closer together and disengages the shelves 81 and 82 from the reels.

Figure 14A:
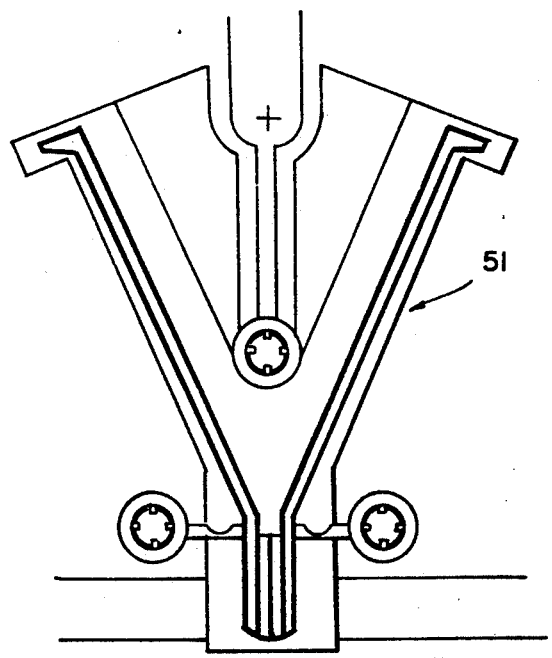
FIGS. 14a and 14b show an alternative living hinge on a reel lock.
Figure 14B:
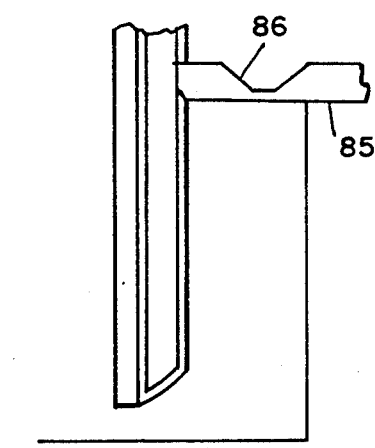

An alternative reel lock incorporates a living hinge, as shown in FIGS. 14a and 14b, which is a groove with beveled sides.

A supplemental spring for the reel lock is shown in FIGS. 15, 16a and 16b. The supplemental spring 87 engages actuation arms 77 and 78 of locking arms 83 and 84 to move the locking lugs into engagement with teeth in the reels. The supplemental spring 87, which is shown in FIG. 15 is a plastic C-shaped spring anchored to supplemental spring anchor 57 integrally molded to and extended from the base. The C-shaped spring increases reliability of the spring arm 87. The plastic spring of FIG. 15 can be made of compatible recyclable materials, as is the material of the cassette, so that retrieval of the spring is not necessary before grinding for recycling.

Alternatively, the spring can be a metal clip 88 which engages the arms, as shown in FIG. 16a. In either case, the springs are preferably C-shaped and engage the actuation arms proximal the point where the pin deflects the actuation arms, thereby more reliably returning the brake to the locked position under extreme conditions.

FIG. 16b shows the metal clip, which is a single length of wire which has been coiled to exert inward force on the actuation arms. The force of the supplemental spring and the living hinges is sufficient to hold the locks against the reels after extensive use under extreme temperature conditions.

Figure 17:
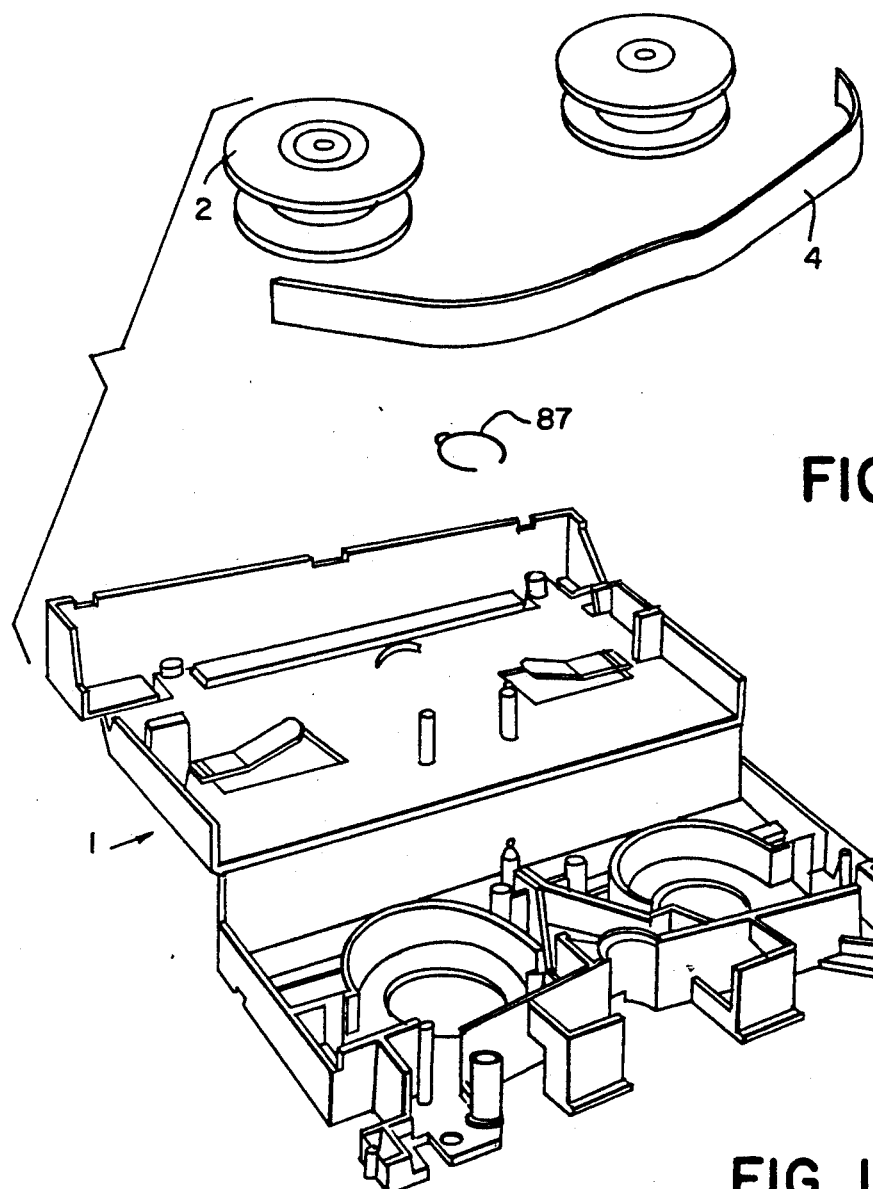
FIG. 17 is a perspective view showing the parts of the present invention, including the integral shell, supplemental spring, supply side and take-up reels and leader.

FIG. 17 shows the package of the present invention. The cassette 1 requires very few supplemental parts, as opposed to the thirty seven for standard video cassettes. Additional parts of the present invention include the supplemental spring 87, two for placement in the rear wells and a leader 4 for attachment of a length of video tape. The improved assembling means of the present invention, which involves welding, provides increased stability, security and quality, as well as simplification during manufacture. The relatively few parts needed to construct the present invention, the low cost of the raw materials needed, and the improved and simplified protection technique provide a product which has a myriad of uses not available before its inception. Further, the present invention is recyclable; thus, marketing on a grand scale does not pollute the environment. The low cost of the present invention would allow marketing on a grand scale, such as mailing campaigns or other promotional giveaways and to provide the video equivalent of a paperback book.

Figure 18A:
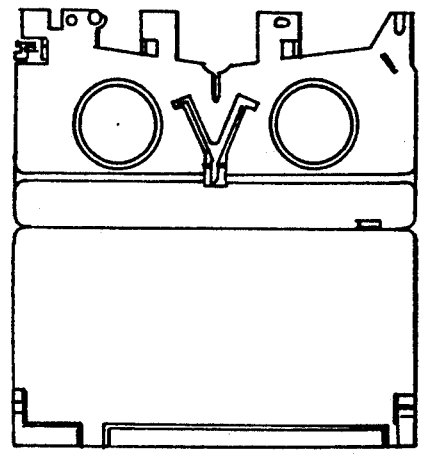
FIGS. 18a and 18b show, respectively, outer and inner front plan views of the present invention.
Figure 18B:
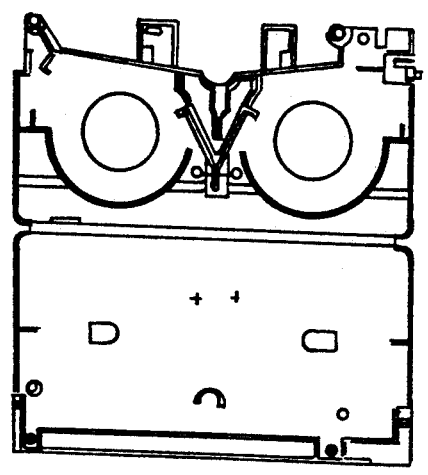

FIGS. 18a 18b show rear and top plan views of the molded cassette. FIG. 18b provides darkened lines which are possible areas for welding of the cover to the base and walls. However, subsequent posts or transverse stabilizers at key stress areas are not beyond the scope of the present invention.

FIG. 19 shows a side view of the cover 11 with downwardly extending leaf spring 15 at a preferred angle of molding. The molded angle 16 is preferably greater than the normal angle of spring-to-reel hub engagement, thereby providing the springing action needed to apply pressure to a reel hub on a reel nested within the reel well.

FIGS. 20a, 20b and 20c provide another preferred embodiment for the reel springs. FIG. 20a shows the cover 11 with perpendicularly molded springs 15. FIG. 20b shows the leaf spring 15 molded to and extending downward from the cover 11. Adjacent the spring, an indentation 91 allows for hinging of the spring towards the indentation. As the cover is closed on the base, the spring revolves towards the cover around the indentation 91, wherein its inner surface 92 proximal the indentation rests against the indentation lip 93, thereby causing the spring to have an angled relationship to the cover. That angled relationship is similar to the spring as shown in FIG. 19, wherein downward pressure against the reel hub is applied by a distal end 94 of the leaf spring.

FIGS. 21a and 21b show an alternate embodiment of a perpendicularly molded leaf spring. The spring 15 has a cover abutment edge 95 angled from a first face 96 of the spring and an opposite integral hinge 97. As shown in FIG. 21a, in the molded perpendicular position the abutment edge 95 is not in contact with the cover edge 98. However, in FIG. 21b the angled abutment edge 95 is snapped into place adjacent the cover edge 98, the angular relationship with the face 96 causing the leaf spring 15 to rotate on its hinge 97 as by arrow 98. That provides an angular leaf spring-cover relationship, as previously shown in FIG. 19, for forcing the distal leaf spring end 94 against a reel hub.

The cutaway side views as shown in FIGS. 22a and 22b show close-ups of the leaf spring and angled relationship between the leaf spring and the cover.

FIG. 23 shows the cover 11, dust cover 13, and integral hinge 19 provided therebetween.

Figure 24:
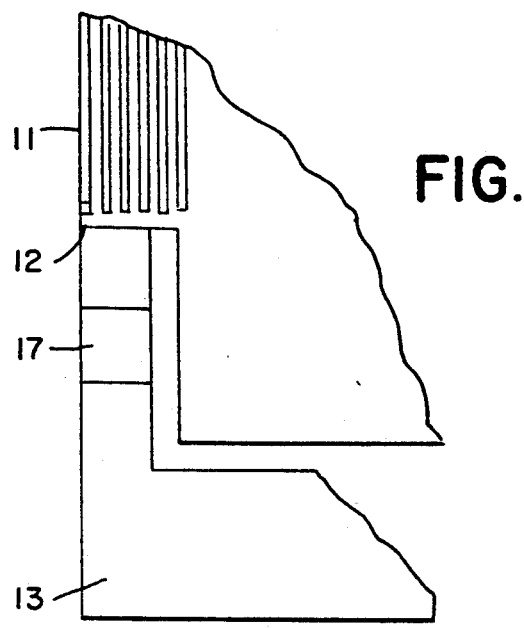
FIG. 24 is a partial top view of the hinged dust door.

In one embodiment as shown in FIG. 24, the integral hinges 19 are peripheral, integrally molded strips on downward extensions at each front edge 12 of the cover. Thus, the dust door is hinged on two strips, one at each end, which allows the dust door to rotate freely, and provides for tape passage between the hinges. The hinge 19 is preferably a molded strip having weakened portions 18 which prescribe the rotational axis of the dust door.

Figure 25A:
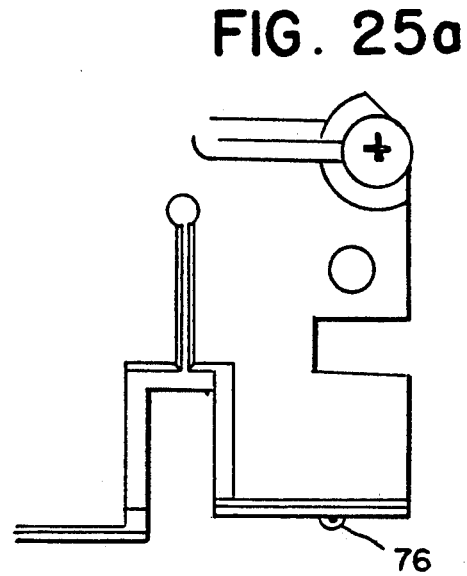
FIGS. 25a, 25b and 25c are top, side and frontal views of the take-up side dust door latch.
Figure 25B:
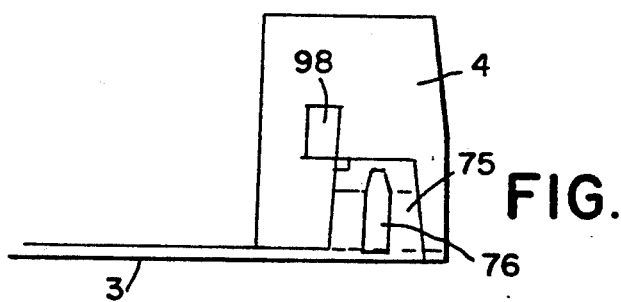
Figure 25C:
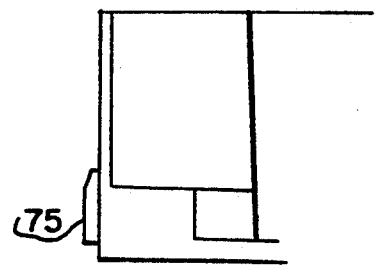

FIGS. 25a, 25b and 25c show the dust door engagement means 76 extending from the base. FIG. 25b shows a side view of the plate 75 and protrusion 76 extending from the base 3. Adjacent the dust door engagement is a section of the front wall 4 incorporating a light source path 98 required for detecting the end of a tape within the cassette. The light source path of the present invention is exterior to the front wall and traverses the front wall extensions 37, as shown in FIG. 1. Further, in FIG. 1 the light path 98 on the take-up side continues from the central light source entrance 99 between the front face 25, but exterior to the central front wall portion 100, through gaps provided within the intervening front wall bridge extensions. FIG. 25c shows a side view of one embodiment of the dust door engagement means.

Figure 26:
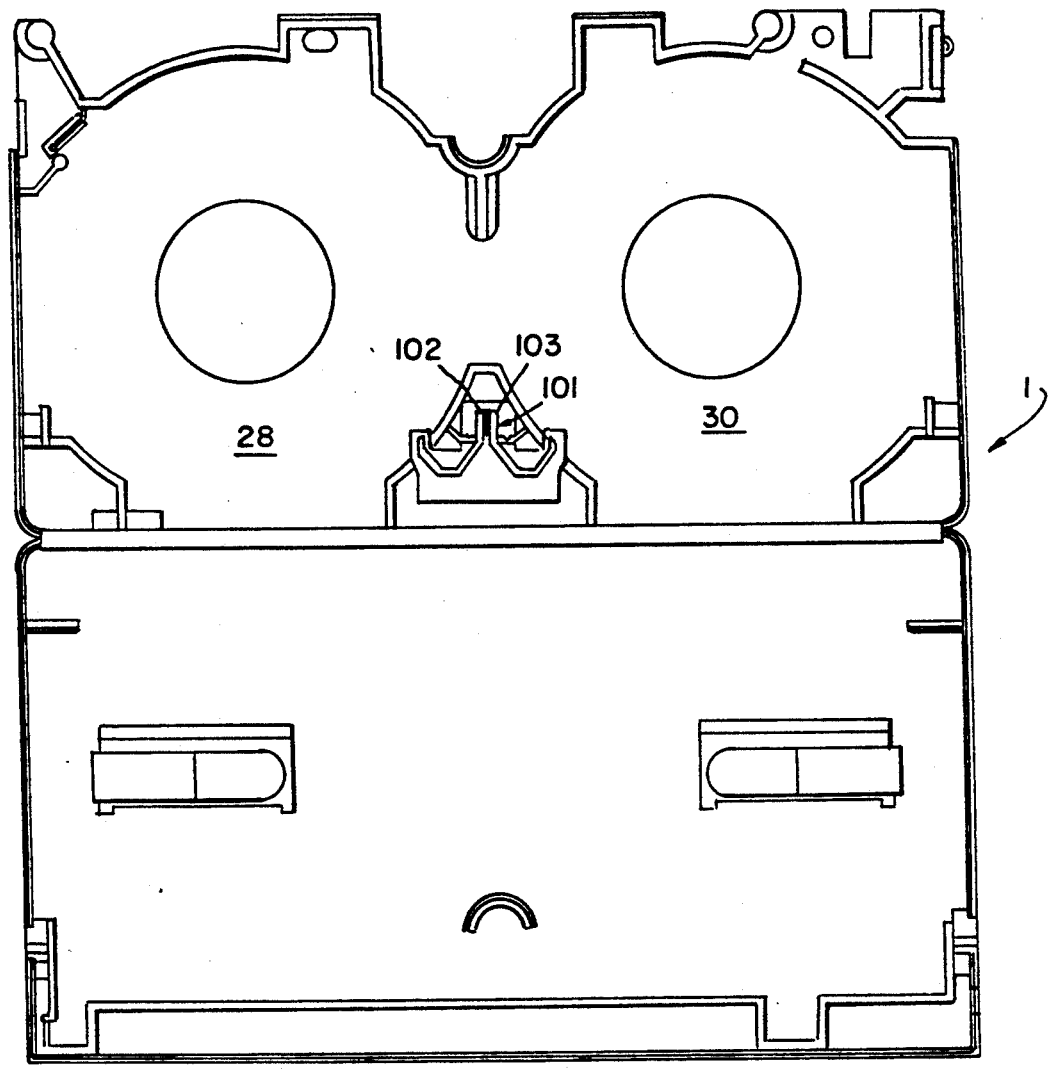
FIGS. 26 and 27 are top views of an alternate reel lock integrally molded with the shell, used mainly in long-play video cassette embodiments.
Figure 27:
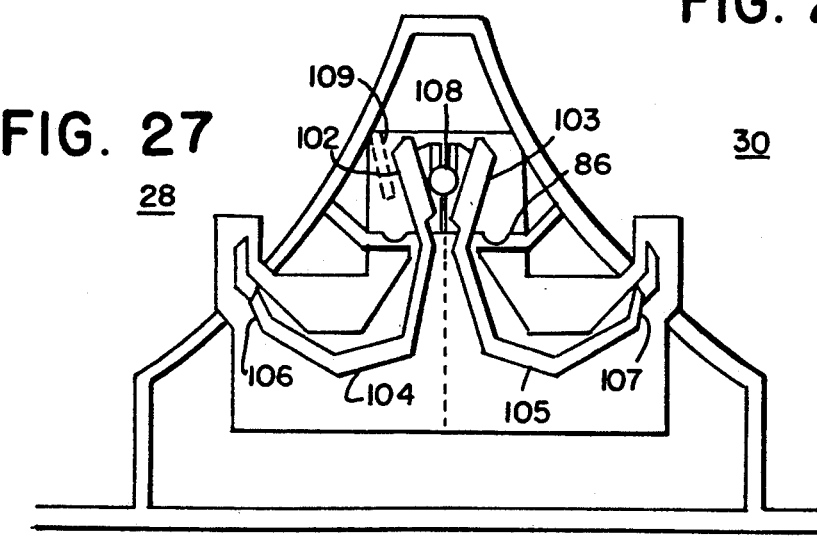

FIGS. 26 and 27 show an alternate integrally molded reel lock 101 for extended play tapes having first and second parallel actuation arms 102 and 103. However, the attached cantilevered extensions 104 and 105 respectively are C-shaped and have reel engagement ends 106 and 107 180 displaced from the parallel actuation arms. Intrusion of an actuation pin 108 causes the angular displacement of the actuation arms 102 and 103, as shown in FIG. 27, which causes the displacement of the ends 106 and 107 from reel wells 28 and 30. The reel lock arms, comprised of the actuation arms extension and extension ends, are hinged at living hinges 86, which are preferably grooves on integral attachments to the shell. However, unlike the reel locks shown in previous figures, the hinged reel lock attachments are connected to the walls of the reel wells. In this embodiment, extensions 109 extending from the reel well walls could act as supplemental springs to restrict the amount of rotational movement around the living hinges 86, and thus maintain the strength of the hinges.

Other embodiments used in conjunction with the present invention include adding a lubricant on the top of the reel contact button. That reduces friction between the polypropylene reel and polypropylene reel leaf spring. Plastic deformation can be caused through winding, fast forwarding and rewinding of the contact hub and spring, which in turn can cause high operating torque. No prior invention has provided lubrication between polypropylene reels and leaf springs to eliminate plastic deformation.

Another embodiment of the present invention is providing polypropylene guide posts, guide ribs and other tape-contacting surfaces. It has been found through experimentation that polypropylene tape-contacting surfaces burnish the tape, actually improving tape performance and reducing dropouts. Thus, it is an object of the present invention to include polypropylene as at least one of the tape-contacting surfaces, such as the interior guide ribs, exterior guide posts, front wall extensions or snubbing arms to improve tape performance. Further, it is also an object of the present invention to construct the entire shell from polypropylene to thereby provide all surfaces with tape-enhancing qualities. As polypropylene enhances tape quality, it also provides up to 40% raw material cost savings in manufacture.

Another object of the invention is to provide a leader tape which is weldable to the reels. Energy directors or welding energy directors can be provided adjacent the leader tape and reel abutment, and subsequent welding would adhere or fuse the leader to the reel. That is advantageous, in that a weld is stronger than previous applications, and further the welding could take place simultaneously with the closing of the cover on the base. That wold greatly save on production time and would result in a more durable reeling system.

Another object of the present invention is to provide polypropylene film which is biaxially or machine-oriented. It has been found that non-oriented polypropylene film does not have adequate tensile strength. Therefore, when welding a leader tape to a reel, biaxially-oriented or machine-oriented polypropylene film provides a much improved product. Further, polypropylene film used in conjunction with the polypropylene tape-contacting surfaces burnishes the tape and adds to its quality.

While the invention has been described with reference to specific embodiments, modifications and variations of the invention may be constructed without departing from the scope of the invention, which is defined in the following claims.

We claim:

1. An integrally molded, welded video cassette apparatus comprising a unitary shell having a base, a rear wall connected to the base, a cover livingly hinged to the rear wall, a front wall extending perpendicularly from the base towards the cover, first and second opposite side walls extending between respective ends of the front wall and rear wall, a dust door livingly hinged to downward extensions of the cover opposite the connection with the rear wall for pivoting over the front wall, reel wells provided on the base for holding reels, a reel lock molded to the shell for engaging the reels within the reel wells, downwardly extending reel springs molded into the cover opposing the reel wells, first and second interior guide means interposed between the reel wells and the exterior of the shell proximal the front wall, first and second exterior guide means for use in conjunction with first and second interior guide means respectively, first and second tape gaps provided between first interior and exterior guide means and second interior and exterior guide means for communicating tape from and to the reel wells, interior and exterior guide means extending perpendicularly from the base towards the cover, alignment means extending between the base and the cover for facilitating alignment and closing of the shell, and welding energy directors provided between at least one of the structures extending between the base and the cover.

2. The apparatus of claim 1, further comprising the shell constructed of a moldable polypropylene or high density polyethylene plastic material.

3. The apparatus of claim 1, the shell further comprising the moldable plastic material being polypropylene.

4. The apparatus of claim 1, further comprising the internal and external guide means being integrally molded to the base and extending perpendicularly to a plane as prescribed thereby, said guide means having weld beads on an end opposite the molded attachment to the base, wherein the cover abuts these ends and the welds provide a perpendicular attachment to a plane as prescribed by the cover.

5. The apparatus of claim 4, further comprising the cover having extensions proximal the front wall, wherein the extensions abut the ends of the guide means to maintain perpendicularity.

6. The apparatus of claim 4, further comprising hollowed structures extending transversely between and perpendicular to the cover and the base, wherein the structures are hollowed for insertion of alignment pins to ensure perpendicularity of the exterior guides.

7. The apparatus of claim 6, further comprising the alignment pins being conductors to assist in the welding of the exterior guide means to the cover.

8. The apparatus of claim 1, further comprising first and second posts extending transversely between and perpendicular to the base and the cover, each post having first and second respective ends, first end integrally molded with the base and second ends provided with welding energy directors for fusing to the cover.

9. The apparatus of claim 8, further comprising cylinders with open cores for accommodating alignment pins to maintain perpendicular alignment between the posts and planes of the base and the cover.

10. The apparatus of claim 9, further comprising conductors for assistance in welding the second guide post ends to the cover.

11. The apparatus of claim 1, further comprising first and second guide ribs integrally molded to the base and extending perpendicularly to a plane as prescribed by the base towards the cover, the ribs incorporating weld beads opposite the molded attachment for fusing to the cover and perpendicularly attaching thereto.

12. The apparatus of claim 11, further comprising posts with planar longitudinal extensions, the posts and attached extensions transversely extending between the cover and the base.

13. The apparatus of claim 12, further comprising the weld bead provided on an end of the post opposite the integral mold with the base.

14. The apparatus of claim 11, further comprising first and second guide ribs provided adjacent first and second reel wells, the first reel well incorporating a supply side reel and the second reel well incorporating a take-up reel, the first rib being the supply side rib and the second rib being the take-up side rib, the supply side rib working in conjunction with a pressure flap for containing any slack from the supply side reel.

15. The apparatus of claim 14, further comprising a pressure flap having a tape-contacting edge and having a radial extension, the extension integrally molded with the shell, the extension provided with a living hinge for providing elasticity to the pressure flap, and the extension having a remote end connected to the base, an opening in the base through which the pressure flap, the extension and the living hinge are formed, and the pressure flap and extension being movable around the living hinge but remaining perpendicular to planes of the cover and the base for moving into an operation position to restrict movement of loose tape from the supply side.

16. The apparatus of claim 1, further comprising a structure having one side integrally molded to the base and extending perpendicularly to a plane prescribed thereby, a second side provided with welding energy directors for perpendicularly fusing to the cover.

17. The apparatus of claim 1, further comprising energy directors integrally molded with upper edge surfaces of the shell, wherein ultrasonic energy concentrated on the energy directors causes the welding and fusing of the shell.

18. The apparatus of claim 1, further comprising plural light screen walls extending forward from the front walls for together forming a clear leader-sensor apertures between a center of the front wall and positions beyond side edges of the front wall.

19. The apparatus of claim 1, wherein the dust door has side walls, and further comprising a light-passing notch, hole, or, transparent portion in both side walls of the dust cover for allowing passage of a signal light through the dust cover side wall.

20. The apparatus of claim 1, wherein the reel leaf springs are formed at angled to the top cover by a mold having movable cores.

21. An integrally molded video cassette apparatus comprising a shell having a base, a front wall and an opposite rear wall perpendicularly extending from a plane as prescribed by the base, a cover hinged to the rear wall, first and second opposite side walls, a dust cover hinged to the cover opposite the rear wall hinge, first and second reel wells provided on the base for nesting first and second reels, a reel lock interposed between the reel wells for engaging the reels, the reel lock having first and second actuation arms with respective first and second angled cantilevered reel engagement arms, first and second locking extensions respectively extending from first and second engagement arms opposite the actuation arms, first and second actuation arms, reel engagement arms and locking extensions being first and second reel lock arms, first and second hubs integrally molded to the base and attached to the first and second reel lock arms proximal the juncture of the actuation and engagement arms, a hub and reel lock arm attachment being integrally molded and provided with a living hinge, hubs and attachment holding the actuation arms parallel with cantilevered engagement arms angled away from each other and causing locking extension to engage reels, an aperture provided in the base for insertion of a lock release mechanism, said lock release mechanism entering the shell between the parallel actuation arms and forcing the rotation of the respective reel lock arms around the living hinges for disengaging the locking extensions from the reel, a supplemental spring respectively engaging each of the reel lock arms for returning the actuation arms to parallel.

22. The apparatus of claim 21, wherein the reel lock hubs are posts integrally molded to the base, extending perpendicularly from the base towards the cover, said posts incorporating mating first connectors for mating with complementary attachment second connectors integrally molded to the cover.

23. The apparatus of claim 21, further comprising the reel lock arm and hub attachment being a planar molded structure integrally attached to the hub and the reel lock arm, the planar structure incorporating a living hinge prescribing the rotational movement of the reel lock arm, said living hinge providing a springing action to restore the actuation arms to the parallel position.

24. The apparatus of claim 23, further comprising the first and second hubs being posts and the planar attachments being longitudinal radial extensions which attach to the locking arms proximal the juncture of the actuation arms and cantilevered engagement arms.

25. The apparatus of claim 24, further comprising the hubs being hollow structures for mating with male attachment means extending from the cover.

26. The apparatus of claim 25, further comprising the hollow posts incorporating inward radial protrusions which engage male cover extensions, guiding the snapping the cover onto the shell.

27. The apparatus of claim 23, further comprising the supplemental spring anchored to an anchor extending from the base.

28. The apparatus of claim 27, wherein the anchor extension is integrally molded with the base and the supplemental spring is attached thereto, the supplemental spring having first and second deflection members for engaging outer sides of first and second actuation arms for limiting the amount of deflection of the respective lock arms and restoring the actuation arms to the parallel position.

29. The apparatus of claim 28, the supplement spring further comprising a structure made of plastic.

30. The apparatus of claim 28, the supplemental spring further comprising a structure made of metal.

31. In an integrally molded video tape cassette apparatus, a reel leaf spring comprises a leaf and a backing snap, both molded to a cover of a video cassette, living hinges provided between the leaf and the cover and the backing snap and the cover, a window provided adjacent the spring and the snap to facilitate molding, the living hinges provided on edges of the window, the leaf spring provided with an angled portion for extending into the video cassette and engaging a reel, the backing snap provided with engagement means for engaging edges of the window, a non-angled portion of the leaf spring abutting the engaged backing snap to force an angled portion onto the reel.

32. The spring of claim 31, further comprising the backing snap having approximately the same dimensions as the window, wherein engagement of the snap substantially closes the window, providing a backing for the spring and sealing the contents from contaminants.

33. The apparatus of claim 32, wherein the snap and window engagement is provided with welding energy directors for welding the snap in place.

34. The apparatus of claim 30, further comprising the leaf having a first and second end, the first end being livingly hinged to an edge of the window and a second end for engaging a reel, an angle provided between the hinge and the reel engagement end, wherein a straight non-angled portion of the leaf is backed and supported by the engaged backing snap and the angled portion extends into the cassette and engages the reel, the angled portion further providing a spring.

35. The apparatus of claim 31, further comprising the backing snap and window engagement means being mated snaps integrally molded to edges of the backing snap and window.

36. The apparatus of claim 31, further comprising the snaps being at least one extension in grooved engagement.

37. The apparatus of claim 36, further comprising the extensions being welded energy directors for fusing the backing snap to the window edge.

38. An integrally molded unitary video cassette comprising a base, a rear wall rigidly connected to the base, a living hinge along a top of the rear wall, a cover having a rear edge connected to the living hinge, tape reel guides formed in the base, and a tape enclosure wall formed along a forward portion of the base, first and second tape-directing cylinders mounted on forward extensions of the base for providing angular turning surfaces for the tape, and first and second tape guide walls mounted on forward extensions of the base between the tape redirecting cylinders for supporting a central span of the tape, further comprising energy directors along upper edges of the tape-enclosing wall, and further comprising support bridges extending forward from a tape-guiding wall and connected to planar tape guides for supporting the tape guides, and energy directors connected along upper edges of the support bridges for welding the upper edges to an inside of the cover.

39. An integrally molded unitary video cassette comprising a base, a rear wall rigidly connected to the base, a living hinge along a top of the rear wall, a cover having a rear edge connected to the living hinge, tape reel guides formed in the base, and a tape enclosure wall formed along a forward portion of the base, first and second tape-directing posts mounted on forward extensions of the base for providing angular turning surfaces for the tape, and first and second tape guide walls mounted on forward extensions of the base between the tape redirecting posts for positioning a central span of the tape, further comprising hollow central portions of the redirecting posts for receiving alignment pins, and further comprising energy directors at the top of the posts for welding the top of the posts to an inside of the cover.

40. An integrally molded unitary video cassette comprising a base, a rear wall rigidly connected to the base, a living hinge along a top of the rear wall, a cover having a rear edge connected to the living hinge, tape reel guides formed in the base, and a tape enclosure wall formed along a forward portion of the base, first and second tape-directing cylinders mounted on forward extensions of the base for providing angular turning surfaces for the tape, and first and second tape guide walls mounted on forward extensions of the base between the tape directing cylinders for supporting a central span of the tape, further comprising tape guide pins mounted on the base and extending upward therefrom between the tape guides and the tape redirecting cylinders, and rib means laterally connected to the pins and extending outward therefrom toward the side walls for supporting the pins when the tape passes by and is guided by the pins.

41. An integrally molded unitary video cassette comprising a base, a rear wall rigidly connected to the base, a living hinge along a top of the rear wall, a cover having a rear edge connected to the living hinge, tape reel guides formed in the base, and a tape enclosure wall formed along a forward portion of the base, first and second tape-directing cylinders mounted on forward extensions of the base for providing angular turning surfaces for the tape, and first and second tape guide walls mounted on forward extensions of the base between the tape redirecting cylinders for supporting a central span of the tape, further comprising a Y-shaped opening in the base and opposite angular reel brakes formed by mold members extended through the Y-shaped opening, the brakes having individual living hinges, posts extending upward from the base and connected to the brake living hinges, and a spring holding ends of the brake levers outward in engagement with the tape winding reels mounted in the base.

42. In a molded video cassette, a pressure flap comprising a tape-contacting edge having a radial extension, the extension being integrally molded to a video cassette shell and resilient so as to allow movement of the tape-contacting edge, the extension holding the tape-contacting edge perpendicular to the path of movement of a tape running within a video cassette for evenly contacting and pressuring the running tape.

43. The pressure flap of claim 42, further comprising the extension provided with a living hinge for providing elasticity and resiliency to the pressure flap.

44. The pressure flap of claim 42, further comprising the extension being molded to a vertically extending portion of the shell proximal a tape path, and having a remote end connected to the base to add elasticity and facilitate molding.

45. The pressure flap of claim 42, further comprising an opening provided in the shell through which the pressure flap is molded.

46. The pressure flap of claim 45, further comprising an opening in the base of the shell.

* * * * *